March 31, 1970 HIROSHI YATABE ET AL 3,504,100
PRESSURE CONNECTIONS BETWEEN OVERLAPPING BUS BAR ENDS
Filed Aug. 13, 1968 2 Sheets-Sheet 1

INVENTORS
HIROSHI YATABE
TAKAJI TAKEI
KEIJI OHSHIMA
HIROSHI MITOME

BY McGlew and Toren

ATTORNEYS

United States Patent Office 3,504,100
Patented Mar. 31, 1970

3,504,100
PRESSURE CONNECTIONS BETWEEN OVERLAPPING BUS BAR ENDS
Hiroshi Yatabe and Takaji Takei, Yokohama-shi, and Keiji Ohshima and Hiroshi Mitome, Hiratsuka-shi, Japan, assignors to Furukawa Denki Kogyo Kabushiki Kaisha, Tokyo, Japan
Filed Aug. 13, 1968, Ser. No. 752,311
Claims priority, application Japan, Aug. 19, 1967, 42/70,978; Mar. 22, 1968, 43/22,321; Apr. 5, 1968, 43/27,275
Int. Cl. H02g 15/08
U.S. Cl. 174—88          9 Claims

ABSTRACT OF THE DISCLOSURE

Each of bus bars of a first section thereof is brought into contact with the corresponding bus bar of a second section by overlapping or butting. The contacting portions of the bus bars are spaced from one another by means of insulating spacers. A resilient fastening plate is provided over each of the outermost contacting portions with interposition of an insulating spacer. Clamping bolts extend through openings in the bus bars and the fastening plates at positions on either side of and apart from the contacting portions to tighten the bus bars and insulating spacers as a unit, with the aid of nuts threaded thereover.

BACKGROUND OF THE INVENTION

The present invention relates to a bus way system, and more particularly to a means for connecting sections of such bus ways together.

U.S. Patent No. 3,183,298 discloses a means for connecting sections of bus ways together. In accordance with this disclosure, the bus bars in the first section overlap the corresponding bus bars in the second section, and an insulating spacer member is disposed between each of overlapping portions of the bus bars. A clamping bolt extends through openings in the bus bars and the insulating spacer members at the overlapping portions of the bus bars so as to clamp together the bus bars and the insulating spacer members.

However, such a connection has several disadvantages: The opening in each bus bar reduces the effective contact area at each of the overlapping portions. The effective contact area is further reduced when additional bolts are used to increase the clamping pressure. Generally, one of the most important factors to ascertain whether the bus way has satisfactory insulating property is the electrical flashover strength between the contacting portions of adjacent bus bars. Since the electrical flashover strength is determined by the creepage distance along the opening in the insulating spacer member, an insulating spacer member must have a relatively large thickness to obtain a necessary creepage distance. This results in a bulky structure of the bus way system. When the insulating spacer member with bolt openings is used under a high clamping pressure, the stress works concentrically on the part near the openings, thereby reducing its mechanical strength. Further, when a plurality of contacting portions are clamped in a unit, there is a considerable increase in the degree of expansion and contraction of the connections due to temperature change. To cope with this, a bevel washer is used in the conventional bus way. This washer has, however, only a limited capability to absorb such expansion and contraction.

SUMMARY OF THE INVENTION

The principal object of the present invention is to provide an improved means for connecting sections of bus way system consisting of bus bars having no bolt openings in their contacting portions and, therefore, having a large effective contacting area. Another object of the present invention is to provide an improved means for connecting sections of bus way system, for which relatively thin insulating spacer members are used to make the connectin compact. Another object of the present invention is to probide an improved means for connecting sections of bus way system, which is free from any concentrated stress and, therefore, has a high mechanical strength. Further object of the present invention is to provide an improved means for connecting sections of bus way system, which is capable of absorbing great expansion and contraction of connections due to temperature change.

Other object objects and advantages of the invention will be apparent from the following description given in connection with the accompanying drawings.

BRIEF DESCRIPTION OF THE DRAWINGS

FIG. 4 is a modification of FIG. 3.

In all the figures, similar reference characters designate corresponding parts throughout.

DESCRIPTION OF THE PREFERRED EMBODIMENTS

Figure 1:
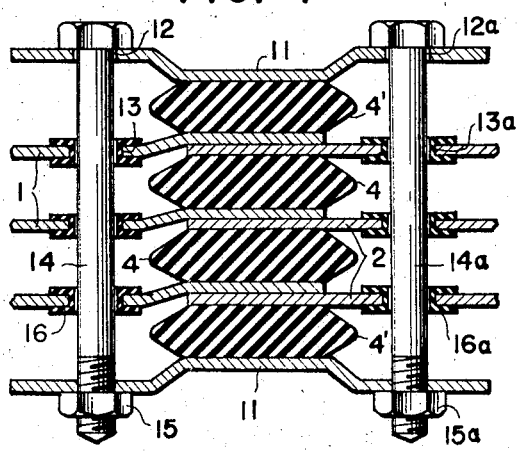
FIG. 1 is an elevational sectional view illustrating the connection of two sets of bus bars.

Referring now to the drawings, and particularly to FIG. 1, both sections of bus bars 1 and 2 each comprise three relatively wide, thin, flat conductor bars. The ends of the bus bars 1 are off-set so that the ends of the bus bars 2 can overlap. Disposed between each of the overlapping portions to the bus bars 1 and 2 is an insulating spacer 4 made of, of for example, a plastic material reinforced with glass fibers. Over the outside of each of the each outermost overlapping portions of the bus bars is arranged a plate spring 11 having an inwardly off-set portion. An insulating spacer 4' similar to the spacer 4 is disposed between each of the outermost overlapping portions of the bus bars and the plate spring 11. Clamping bolts 14 and 14a extend, at positions on either side of and apart from the overlapping portions of the bus bars in their longitudinal direction, through openings 12 and 12a in the plate spring 11 and openings 13 and 13a in the bus bars 1 and 2. Nut 15 and 15a is threaded over one end of each of bolts 14, 14a respectively. The overlooking bus bars 1 and 2 are then electrically and mechanically connected together by tightening the nuts 15 and 15a over the bolts 14 and 14a. The diameter of the openings 13 and 13a is made larger than the outer diameter of the bolts 14 and 14a. An insulating bushing 16 or 16a is provided in each of the openings of the bus bars to insulate the bolt 14 or 14a from each bus bar.

The above structure can provide a sufficiently large effective contact area at each overlapping portion of bus bars. Moreover, since the insulating spacer has no opening and, therefore, the electrical flashover strength between the adjacent bus bars at the overlapping portion is determined by creepage length along the contour of the insulating spacer, the space between the adjacent bus can be reduced as compared with a prior construction by properly forming the contour of the spacer. Having no openings, the insulating spacer member, when clamped, is free from any concentrated stress and, therefore, has a high mechanical strength. As, moreover, the expansion and contraction of the connection due to temperature change is absorbed by plate spring, there is a considerably margin in the range of such expansion and contraction.

Figure 2:
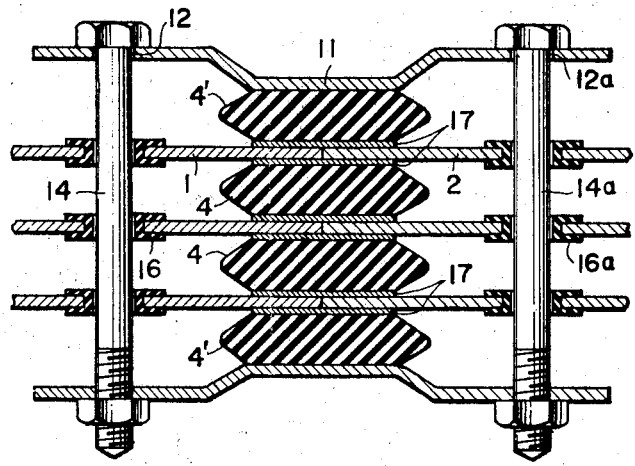
FIG. 2 is an elevational sectional view, similar to FIG. 1, of a second embodiment.

The connection illustrated in FIG. 2 differs from that illustrated in FIG. 1 in that each bus bar 1 in the first section is butted to a bus bar 2 in the second section and conductive bridge plates 17 are put on both sides of each butting portion of the bus bars. This connection has the advantage that the ends of bus bars in at least one section need not be bent for off-setting as in FIG. 1.

Figure 3:
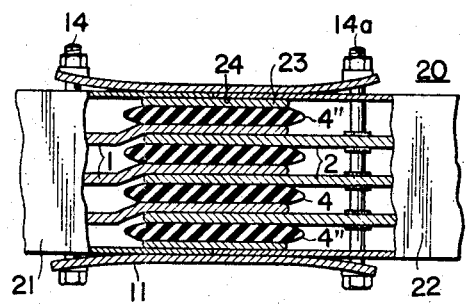
FIG. 3 is an elevational view, partly in section, of the connection of two sections of bus duct.

In FIG. 3, two sections 1 and 2 of bus bars are enclosed in a generally rectangular metal ducts 21 and 22 respectively of any known construction. The ducts in two sections 21 and 22 are arranged in butting relation to each other. The bus bars 1 and 2 overlap in a similar manner to FIG. 1, and an insulating spacer 4 is disposed between each of the overlapping portions of the bus bars. The inner surface 24 of the duct 21 and 22 at the connection of bus bars are made uncoated and clean and bridged by a conductor plate 23 thereover. An insulating spacer 4″ similar to the spacer 4 is disposed between each of the outermost overlapping portions of the bus bars and the conductor plate 23. In this embodiment, plate springs 11 are provided on the outer surfaces of the ducts 21 and 22. Clamping bolts 14, 14a extend through openings in the plate springs, the duct and the bus bars, at positions on either side of and apart from the overlapping portions of the bus bars, to tighten the connection as a unit. This embodiment has the advantage that electrical connection between both sections of the duct can be established within the duct without spoiling the external appearance of the duct. Moreover, the connection can dispense with bonding means.

Figure 4:
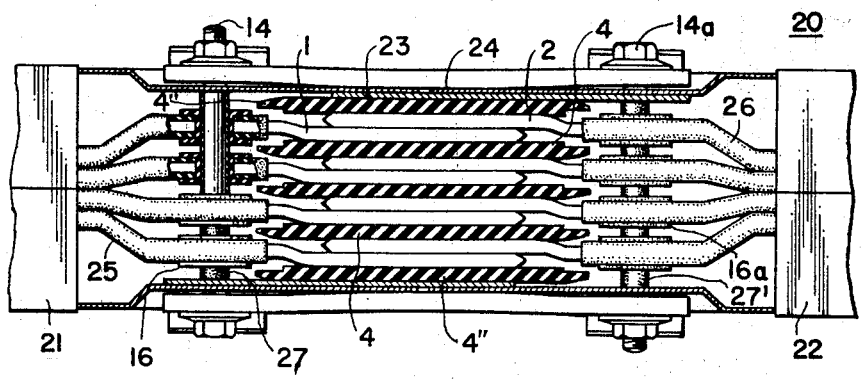
FIG. 4 is is a modification of FIG. 3.

The connection illustrated in FIG. 4 differs from that illustrated in FIG. 3 in that each bus bar 1 or 2 of both sections except its connecting portion is covered with an insulating material 25 or 26 and that bolts 14 and 14a are surrounded by insulating tubes 27 and 27a respectively. Bushings 16 and 16a are provided in the opening of bus bars 1 and 2 to surely insulate bolts from bus bars. The bus duct can be made more compact than the one shown in FIG. 3.

It will be understood that modifications and variations may be effected without departing from the spirit and scope of the present invention.

What is claimed is:

1. A means for connecting bus way systems comprising two sections of bus bars, each bus bar of the first section contacting with the corresponding bus bar of the second section, an insulating spacer member disposed between each contacting portion of said bus bars, fastening members each arranged over the outside of the outermost contacting portions, an insulating spacer member disposed between each of the outermost contacting portions and each of said fastening members, clamping members each extending through openings in said bus bars and said fastening members at positions on either side of and apart from said contacting portions, and insulating members for insulating said clamping members from said bus bars, said clamping members tightening said bus bars and said insulating spacer members as a unit.

2. A means for connecting bus way systems according to claim 1, wherein each bus bar of the first section overlaps the corresponding bus bar of the second section.

3. A means for connecting bus way system according to claim 1, wherein each bus bar of the first section butts the corresponding bus bar of the second section and each butting portion of said bus bars is held between electrically conductive members.

4. A means for connecting bus way systems comprising two sections of bus bars housed in two sections of duct respectively, each bus bar of the first section contacting with the corresponding bus bar of the second section, said two ducts arranged in butting relation to each other, an insulating spacer member disposed between each contacting portion of said bus bars, an insulating spacer member disposed between each of the outermost contacting portions and the duct, fastening members each arranged over the outside of said ducts, clamping members each extending through openings in said bus bars, duct and fastening members at positions on either side of and apart from said contacting portions, and insulating members for insulating said clamping members from said bus bars, said clamping members tightening said bus bars and said insulating spacer members as a unit together with said duct.

5. A means for connecting bus way systems according to claim 4, wherein each bus bar of the first section overlaps the corresponding bus bar of the second section.

6. A means for connecting bus way systems according to claim 4, wherein each bus bar of the first section butts the corresponding bus bar of the second set and each butting portion of said bus bars is held between electrically conducting members.

7. A means for connecting bus way systems according to claim 4, wherein the inner surface of said ducts at the connecting portions is made uncoated and clean and bridged with electrically conducting members disposed between the duct and each of the outermost insulating spacer members.

8. A means for connecting bus way systems according to claim 7, wherein each bus bar is covered with an insulating material except for its connecting portion and insulating bushings are fit in the openings in bus bars through which bolts are applied.

9. A means for connecting bus way systems according to claim 7, wherein each bus bar is covered with an insulating material except for its connecting portion, said clamping members are each surrounded with an insulating tubular member and insulating bushings are fit in the openings in bus bars through which bolts are applied.

References Cited

UNITED STATES PATENTS

| | | |
|---|---|---|
| 3,004,096 | 10/1961 | Rowe. |
| 3,004,097 | 10/1961 | Johnston et al. |
| 3,339,009 | 8/1967 | Davis et al. |

DARRELL L. CLAY, Primary Examiner

U.S. Cl. X.R.

174—99